(12) United States Patent
Cho et al.

(10) Patent No.: US 9,105,922 B2
(45) Date of Patent: Aug. 11, 2015

(54) NEGATIVE ACTIVE MATERIAL, AND NEGATIVE ELECTRODE AND LITHIUM BATTERY EACH INCLUDING THE NEGATIVE ACTIVE MATERIAL

(71) Applicant: SAMSUNG SDI CO., LTD., Yongin-si, Gyeonggi-do (KR)

(72) Inventors: Yu-Jeong Cho, Yongin-si (KR); Sang-Eun Park, Yongin-si (KR); So-Ra Lee, Yongin-si (KR); Su-Kyung Lee, Yongin-si (KR); Ui-Song Do, Yongin-si (KR); Chang-Su Shin, Yongin-si (KR); Jae-Myung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/134,313

(22) Filed: Dec. 19, 2013

(65) Prior Publication Data

US 2014/0234714 A1    Aug. 21, 2014

(30) Foreign Application Priority Data

Feb. 15, 2013    (KR) .................... 10-2013-0016598

(51) Int. Cl.
*H01M 4/38* (2006.01)
*H01M 4/36* (2006.01)
(Continued)

(52) U.S. Cl.
CPC ............. *H01M 4/366* (2013.01); *H01M 4/386* (2013.01); *H01M 4/625* (2013.01); *H01M 4/626* (2013.01); *B82Y 99/00* (2013.01); *H01M 10/0525* (2013.01); *Y02E 60/122* (2013.01); *Y02T 10/7011* (2013.01); *Y10S 977/735* (2013.01); *Y10S 977/742* (2013.01); *Y10S 977/948* (2013.01)

(58) Field of Classification Search
CPC ...... H01M 4/386; H01M 4/366; B82Y 99/00; Y10S 977/735
USPC ............... 429/211, 231.8, 338, 342; 427/122; 206/57, 66, 60
See application file for complete search history.

(56) References Cited

U.S. PATENT DOCUMENTS

2002/0164479 A1    11/2002    Matsubara et al.
2005/0136330 A1    6/2005    Mao et al.
(Continued)

FOREIGN PATENT DOCUMENTS

KR    10-2007-0086981 A    8/2007
KR    10-2010-0127990 A    12/2010
(Continued)

OTHER PUBLICATIONS

Extended European Search Report dated May 23, 2014 for European Application No. 14154660.6, 5 pgs.
(Continued)

*Primary Examiner* — Mark F. Huff
*Assistant Examiner* — Monique Wills
(74) *Attorney, Agent, or Firm* — Christie, Parker & Hale, LLP

(57) ABSTRACT

A negative active material and a lithium battery are provided. The negative active material includes a composite core, and a coating layer formed on at least part of the composite core. The composite core includes a carbonaceous base and a metal/metalloid nanostructure disposed on the carbonaceous base. The coating layer includes a metal oxide coating layer and an amorphous carbonaceous coating layer.

18 Claims, 5 Drawing Sheets

(51) Int. Cl.
*H01M 4/62* (2006.01)
*B82Y 99/00* (2011.01)
*H01M 10/0525* (2010.01)

(56) References Cited

U.S. PATENT DOCUMENTS

| | | |
|---|---|---|
| 2010/0297502 A1 | 11/2010 | Zhu et al. |
| 2010/0301276 A1 | 12/2010 | Lee et al. |
| 2012/0282540 A1 | 11/2012 | Niu et al. |
| 2012/0301789 A1 | 11/2012 | Loveness et al. |
| 2014/0134495 A1* | 5/2014 | Belharouak et al. ........ 429/231.8 |
| 2014/0162120 A1* | 6/2014 | Fujii et al. ..................... 429/211 |
| 2014/0248543 A1* | 9/2014 | Zhu et al. ...................... 429/338 |

FOREIGN PATENT DOCUMENTS

| | | |
|---|---|---|
| KR | 10-2012-0024713 A | 3/2012 |
| WO | WO 2012/105669 A1 | 8/2012 |

OTHER PUBLICATIONS

Park et al., Employment of Encapsulated Si with Mesoporous $TiO_2$ Layer As Anode Material for Lithium Secondary Batteries; *Transactions of Nonferrous Metals Society of China*, vol. 19, No. 4, Aug. 1, 2009, 4 pages, XP-026470816.

* cited by examiner

NEGATIVE ACTIVE MATERIAL, AND NEGATIVE ELECTRODE AND LITHIUM BATTERY EACH INCLUDING THE NEGATIVE ACTIVE MATERIAL

CROSS-REFERENCE TO RELATED APPLICATION

This application claims priority to and the benefit of Korean Patent Application No. 10-2013-0016598, filed on Feb. 15, 2013, in the Korean Intellectual Property Office, the entire content of which is incorporated herein by reference.

BACKGROUND

1. Field

The following description relates to a negative active material, a negative electrode including the same, and a lithium battery including the negative electrode.

2. Description of the Related Art

Lithium secondary batteries used in portable electronic devices for information communications, such as personal data assistants (PDAs), mobile phones, and laptop computers, electric bicycles, electric vehicles, and the like have a higher discharge voltage of about twice or more than existing batteries, and thus exhibit a high energy density.

Lithium batteries include a positive electrode and a negative electrode, each including an active material that allows intercalation and deintercalation of lithium ions, and an organic electrolyte or a polymer electrolyte filling the gap between the negative and positive electrodes. Lithium batteries produce electrical energy from redox reactions that take place as lithium ions are intercalated into or deintercalated from the positive electrode and negative electrode.

Carbonaceous materials in various forms, such as artificial graphite, natural graphite or hard carbon, which allow intercalation and deintercalation of lithium ions, and non-carbonaceous materials such as silicon (Si) have been studied for use as negative electrode active materials of lithium secondary batteries.

Such non-carbonaceous materials exhibit a very high capacity density ten times or greater than that of graphite. However, the volumetric expansion and shrinkage of non-carbonaceous materials during charging and discharging of the lithium secondary batteries may deteriorate the capacity retention rate, charge/discharge efficiency, and battery life characteristics of a battery.

Therefore, there is a desire for the development of high-performance negative active materials with improved capacity characteristics and improved cycle lifetime characteristics.

SUMMARY

Aspects of one or more embodiments of the present invention are directed toward a negative active material able to improve capacity characteristics and cycle lifetime characteristics of a lithium battery.

Aspects of one or more embodiments of the present invention are directed toward a negative electrode employing the negative active material.

Aspects of one or more embodiments of the present invention are directed toward a lithium battery including the negative electrode.

Additional aspects will be set forth in part in the description which follows and, in part, will be apparent from the description, or may be learned by practice of the presented embodiments.

According to one or more embodiments, a negative active material includes: a composite core including a carbonaceous base, and a metal or metalloid nanostructure on the carbonaceous base; and a coating layer including a metal oxide coating layer and an amorphous carbonaceous coating layer formed on at least part of the composite core.

According to one or more embodiments, a negative electrode includes the above-defined negative active material.

According to one or more embodiments, a lithium battery includes the above-defined negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
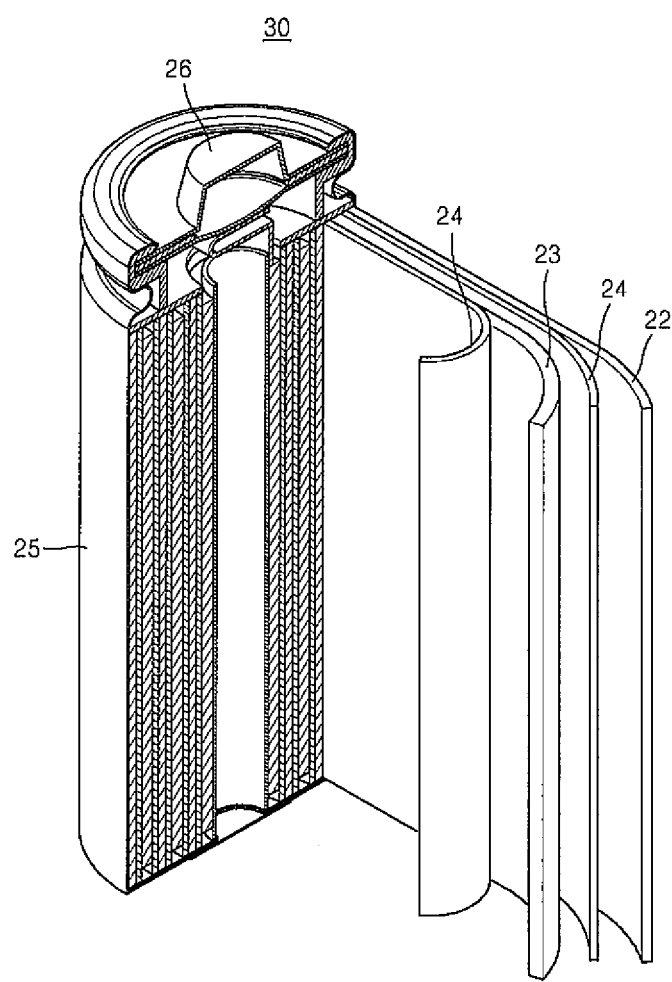
FIG. 1 is a schematic view of a structure of a lithium battery according to an embodiment.

Reference will now be made in more detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an embodiment, a negative active material includes a composite core, and a coating layer disposed on at least part of the composite core, wherein the composite core includes a carbonaceous base, and a metal/metalloid nanostructure disposed on the carbonaceous base, and the coating layer includes a metal oxide coating layer and an amorphous carbonaceous coating layer.

The negative active material may include a double coating layer, i.e., including the metal oxide coating layer and the amorphous carbonaceous coating layer, on the composite core including the carbonaceous base and the metal/metalloid nanostructure disposed on the carbonaceous base to prevent side reactions between the composite core and an electrolyte, to control the expansion rate of the composite core, and to improve conductivity of the negative active material. Accordingly, a lithium battery using the negative active material may be improved in capacity, initial efficiency, and battery life characteristics.

The coating layer may include a metal oxide coating layer and an amorphous carbonaceous coating layer. In some embodiments, the metal oxide coating layer may be disposed on the composite core, and the amorphous carbonaceous coating layer may be disposed on the metal oxide coating layer. In some other embodiments, the amorphous carbonaceous coating layer may be disposed on the composite core, and the metal oxide coating layer may be disposed on the amorphous carbonaceous coating layer.

The metal of the metal oxide in the metal oxide coating layer may be at least one selected from the elements of Groups 2 to 13 of the periodic table of elements. In other words, the metal of the metal oxide excludes the elements of Group 1 and Groups 14 to 16 of the periodic table of elements.

For example, the metal of the metal oxide may be at least one selected from zirconium (Zr), nickel (Ni), cobalt (Ca), manganese (Mn), boron (B), magnesium (Mg), calcium (Ca), strontium (Sr), barium (Ba), titanium (Ti), vanadium (V), iron (Fe), copper (Cu), and aluminum (Al).

In some embodiments, the metal oxide may be represented by Formula 1 below:

$$M_aO_b \qquad \text{<Formula 1>}$$

In Formula 1 above, 1≤a≤4, 1≤b≤10, and M is at least one selected from zinc (Zn), Zr, Ni, Co, Mn, B, Mg, Ca, Sr, Ba, Ti, V, Fe, Cu, and Al.

In some other embodiments, the metal oxide may include at least one selected from titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide. For example, the metal oxide may be $TiO_2$, $Al_2O_3$, or $ZrO_2$.

For example, the metal oxide may be inert to lithium. For example, the metal oxide may not react with lithium so as not to form a lithium metal oxide. That is to say that the metal oxide does not merely function as a negative active material allowing intercalation/deintercalation of lithium, it may also serve as a conductor which is a transport path of lithium ions and/or electrons, and a protective layer for preventing side reactions with an electrolyte solution. In some embodiments, the metal oxide may serve as an electric insulator and a protective layer for preventing side reactions with the electrolyte solution.

In some embodiments, an amount of the metal oxide coating layer in the negative active material may be from about 0.1 wt % to about 10 wt % based on a total weight of the negative active material, and in some embodiments, from about 0.1 wt % to about 5 wt %, and in some other embodiments, from about 0.5 wt % to about 2 wt %, each based on a total weight of the negative active material. In one embodiment, when the amount of the metal oxide of the coating layer is within these ranges, the initial efficiency and battery life characteristics of a lithium battery are effectively improved.

The coating layer may include an amorphous carbonaceous coating layer. The term "carbonaceous" refers to the inclusion of at least about 50 wt % of carbon. For example, the carbonaceous coating layer may include at least about 60 wt %, about 70 wt %, about 80 wt %, or about 90 wt % of carbon, and in some embodiments, about 100 wt % of carbon. The term "amorphous" refers to those materials without a definite crystalline structure. For example, the amorphous carbonaceous coating layer may include at least about 50 wt %, about 60 wt %, about 70 wt %, about 80 wt %, or about 90 wt % of amorphous carbon, and in some embodiments, about 100 wt % of amorphous carbon.

The amorphous carbonaceous coating layer may support the metal/metalloid nanostructure so that the metal/metalloid nanostructure is not separated from the composite core during charging/discharging, and may suppress volume expansion of the composite core, and thus improve stability and electrode life.

In some embodiments, the amorphous carbonaceous coating layer may include a material selected from soft carbon (carbon sintered at low temperatures), hard carbon, carbon pitch, meso-phase carbon pitch, sintered corks, and combinations thereof.

The amorphous carbonaceous coating layer may be coated using a dry coating method, or a liquid coating method, but is not limited thereto. Non-limiting examples of dry coating methods are deposition, chemical vapor deposition (CVD), or the like. Non-limiting examples of liquid coating methods are dipping, spraying, or the like. For example, primary particles with silicon-based nanowires disposed on a non-carbonaceous conductive core may be coated with a carbon precursor, for example, coal tar pitch, meso-phase pitch, petroleum pitch, coal tar oil, intermediate crude oil (petroleum), organic synthetic pitch, or polymer resin such as phenol resin, furan resin, or polyimide resin, and then thermally treated to form an amorphous carbonaceous coating layer.

For example, an amount of the amorphous carbonaceous coating layer may be from about 0.1 wt % to about 30 wt %, and in some embodiments, from about 1 wt % to about 25 wt %, and in some other embodiments, from about 5 wt % to about 25 wt %, each based on a total weight of the negative active material. In one embodiment, when the amount of the amorphous carbonaceous coating layer is within these ranges, the batter life characteristics of a lithium battery is effectively improved.

In some embodiments, the metal oxide coating layer may be disposed on the composite core, and the amorphous carbonaceous coating layer may be disposed on the metal oxide coating layer. In this structure of the coating layer with the metal oxide coating layer disposed on the composite core, and the amorphous carbonaceous coating layer disposed on the metal oxide coating layer, the amorphous carbonaceous coating layer forming an external surface of the composite core may reduce expansion rate of the composite core during charging/discharging and may improve surface conductivity of the negative active material, and consequently may improve battery life of the lithium battery.

In some other embodiments, the amorphous carbonaceous coating layer may be disposed on the composite core, and the metal oxide coating layer may be disposed on the amorphous carbonaceous coating layer. In this structure of the coating layer with the amorphous carbonaceous coating layer disposed on the composite core, and the metal oxide coating layer disposed on the amorphous carbonaceous coating layer, the amount of the amorphous carbonaceous coating layer may be relatively low, which may improve the capacity and the initial efficiency of a lithium battery. Furthermore, the metal oxide coating layer forming an external surface of the composite core may prevent side reactions with electrolyte, and may effectively improve battery life characteristics, in particular, at high temperatures.

The composite core coated with the coating layer includes a metal/metalloid nanostructure disposed on a carbonaceous base.

The carbonaceous base may include crystalline carbon. The term "crystalline" refers to the inclusion of at least 50 wt % of carbon having a hexagonal crystal lattice structure in which carbon atom forming $sp^2$ hybrid orbital is covalently bound with three carbon atoms. For example, the carbonaceous base may include about 60 wt %, about 70 wt %, about 80 wt %, or about 90 wt % of crystalline carbon, and in some embodiments, about 100 wt % of crystalline carbon. The hexagonal crystal lattice structure may form a single layer or multi-layer structure, or may have any of various suitable structures, for example, a 2-dimensional structure that is bent or rolled, or that has a partial defect. For example, a plurality of hexagonal crystal lattice structures may be connected to each other like a soccer ball. The carbonaceous base may have any crystalline structure that allows reversible intercalation and deintercalation of lithium ions during charging and discharging.

In some other embodiments, a crystalline carbonaceous core may include natural graphite, artificial graphite, expandable graphite, graphene, carbon black, fullerene soot, or combinations thereof, but is not limited thereto. Examples of natural graphite, which is naturally occurring graphite, are flake graphite, high-crystalline graphite, microcrystalline or cryptocrystalline (amorphous) graphite, or the like. Examples of artificial graphite, which is artificially synthesized by heating amorphous carbon at a high temperature, are primary graphite, electrographite, secondary graphite, graphite fiber, or the like. Expandable graphite is graphite with vertically expanded molecular layers obtained by intercalating a chemical compound, such as acid or alkali, between the molecular layers of the graphite and heating the same. Graphene is a single-layered graphite. The carbon black is a crystalline material less ordered as compared with graphite. The carbon black may change into graphite if heated at about 3,000° C. for a long time. The fullerene soot is a carbon mixture including at least 3 wt % of fullerene as a polyhedral bundle compound having 60 or more carbon atoms. The carbonaceous core may include one of these crystalline carbonaceous materials alone or at least two thereof. For example, the natural graphite may be used in order to obtain a composition with a higher density in preparing a negative electrode.

The carbonaceous base may be in spherical, planar, fibrous, tubular, or powder form. For example, the carbonaceous base may have a spherical or tubular form. When the carbonaceous base is in spherical form, the carbonaceous base may have a circularity of from about 0.7 to about 1.0. Circularity is a measure of a degree of deviation from an ideal sphere, which may range from about 0 to 1. The nearer the number to 1, the closer the form of an object is to the ideal sphere. For example, the carbonaceous base may have a circularity of from about 0.8 to about 1.0, and in some embodiments, from about 0.9 to about 1.0. A carbonaceous base in planar form may have a circularity of about less than 0.7.

An average particle diameter of the carbonaceous base is not particularly limited. When the average particle diameter of the carbonaceous base is too small, reactivity with the electrolyte solution is so high that cycling characteristics may be lower. When the average particle size is too large, dispersion stability in preparing negative electrode slurry may be poor, so that a negative electrode manufactured from the slurry may have a rough surface. For example, the carbonaceous base may have an average particle diameter of from about 1 μm to about 30 μm, and in some embodiments, from about 5 μm to about 25 μm, and in some other embodiments, from about 10 μm to about 20 μm.

The carbonaceous base may serve as a support for the metal/metalloid nanostructure disposed thereon, and suppress a volumetric change of the metal/metalloid nanostructure during charging/discharging. The carbonaceous base may include pores in the base. The pores in the carbonaceous base may further effectively suppress a volumetric change of the metal/metalloid nanostructure during charging/discharging.

The metal/metalloid nanostructure is disposed on the carbonaceous base.

The metalloid nanostructure may be formed as at least one selected from nanowires, nanotubes, nanobelts, nanorods, nanoporous bodies, and nanotemplates, but is not limited thereto. The nanostructure may have any of a variety of structures in nanoscales, excluding nanoparticles (i.e., spherical shaped nanoparticles).

For example, the metalloid nanostructure may be a nanowire. The term "nanowire" refers to a wire structure having a cross-sectional diameter in nanometers. For example, the nanowire may have a cross-sectional diameter of from about 1 nm to about 500 nm, and a length of from about 0.1 μm to about 100 μm. For example, the nanowire may have an aspect ratio of from about 5 or greater, and in some embodiments, about 10 or greater, and in some other embodiments, about 50 or greater, and in still other embodiments, about 100 or greater. The nanowire may have a substantially constant diameter or a varying diameter. The major axis of the nanowire may be at least partially straight, curved, bent, or branched. The nanowire may effectively absorb a volumetric change of metal/metalloid during the charging/discharging of a lithium battery.

The metal/metalloid nanostructure may include at least one element selected from the elements of Groups 13, 14, and 15 of the periodic table of elements. The "metal/metalloid" refers to an element capable of intercalating and deintercalating lithium, and that may be classified as a metal and/or a metalloid in the periodic table of elements, wherein carbon is excluded. In some embodiments, the metal/metalloid nanostructure may include an element selected from aluminum (Al), gallium (Ga), indium (In), thallium (Tl), silicon (Si), germanium (Ge), tin (Sn), lead (Pb), antimony (Sb), bismuth (Bi), and combinations thereof.

In some other embodiments, the metal/metalloid nanostructure may include at least one element selected from Si, Ge, and Sn.

The metal/metalloid nanostructure may be a silicon-based nanowire. The term "silicon-based" refers to the inclusion of about 50 wt % or greater of Si, for example, at least about 60 wt %, about 70 wt %, about 50 wt %, or about 90 wt % of Si, in some other embodiments, about 100 wt % of Si. The silicon-based nanowire may be any of a variety of silicon-based materials, for example, a material selected from Si, $SiO_x$ (0<x<2), a Si—Z alloy (wherein Z is an alkali metal, an alkali earth metal, a Group 13 element, a Group 14 element, a transition metal, a rare-earth element, or a combination thereof; and is not Si), and a combination thereof. The element Z may be selected from Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. The silicon-based material, such as Si, $SiO_x$, or a Si—Z alloy, may be an amorphous silicon, a crystalline silicon (either monocrystalline or polycrystalline), or combinations thereof. These silicon-based nanowires may be used alone or in a combination of at least two thereof. For example, the silicon-based nanowire may be a Si nanowire with high capacity. The silicon-based nanowire may further include a dopant in order to improve conductivity. For example, the dopant may be a Group 13 element or a Group 15 element. For example, the dopant may be P, B, or the like.

The silicon-based nanowire may be prepared by directly growing silicon-based nanowires on a carbonaceous base, or by arranging previously grown silicon-based nanowires onto a carbonaceous base by attaching or binding the same to the carbonaceous base.

The silicon-based nanowire may be arranged on the carbonaceous base by various suitable methods and is not particularly limited to any specific methods. For example, the Si nanowire may be grown using a vapor-liquid-solid (VLS) growing method, or by using a nano-sized catalyst for thermally decomposing a precursor gas near the catalyst. When the silicon-based nanowire is directly grown on a carbonaceous base, a metal catalyst may or may not be present. Examples of the metal catalyst are Pt, Fe, Ni, Co, Au, Ag, Cu, Zn, Cd or the like.

In some embodiments, the composite core may include a sufficient amount of a metal/metalloid nanostructure, and an appropriate amount of the carbonaceous base that is sufficient to support the metal/metalloid nanostructure. For example, an amount of the carbonaceous base in the composite core may be from about 60 wt % to about 99 wt % based on a total weight of the composite core. An amount of the metal/metalloid nanostructure may be from about 1 wt % to about 40 wt % based on a total weight of the composite core.

In some embodiments, the primary particle unit of the negative active material having a structure as described above (i.e., a composite core, and a coating layer disposed on at least part of the composite core) may be agglomerated or bound to each other or may form secondary particles with an active material component having different primary particle units.

According to other embodiments, a negative electrode includes any of the negative electrode active materials according to the above-described embodiments. For example, the negative electrode may be manufactured by molding a negative active material composition into a constant shape, the negative active material composition including the above-described negative active material, a binder, and optionally a conducting agent; or by coating the negative active material composition on a current collector such as a copper foil.

In particular, the negative active material, a conducting agent, a binder, and a solvent may be mixed together to prepare the negative active material composition. The negative active material composition may be directly coated on a metallic current collector to manufacture a negative electrode plate. In some other embodiments, the negative active material composition may be cast on a separate support to form a negative active material film, which may then be separated from the support and laminated on a metallic current collector to manufacture a negative plate. The negative electrode is not limited to the examples described above, and may be one of a variety of types.

In some embodiments, the negative active material composition may further include a carbonaceous negative active material, in addition to the above-described negative active material. For example, the additional carbonaceous negative active material may be at least one selected from natural graphite, artificial graphite, expandable graphite, graphene, carbon black, fullerene soot, carbon nanotube, and carbon fiber, but is not limited thereto, and may be any carbonaceous base available in the art.

The additional carbonaceous negative active material may be, for example, in spherical, planar, fibrous, tubular, or powder form. For example, the additional carbonaceous negative active material may be added in original form, for example, in spherical, planar, fibrous, tubular, or powder form, into the negative active material, or may be added in the form of spherical particles into the negative active material via spheroidizing treatment with the carbonaceous base.

Non-limiting examples of the binder are polyvinylidene fluoride (PVDF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, polyethylene, polypropylene, polystyrene, polymethylmethacrylate, polyaniline, acrylonitrile butadiene styrene, phenol resin, epoxy resin, polyethylene terephthalate, polytetrafluoroethylene, polyphenyl sulfide, polyamide imide, polyether imide, polyethylene sulfone, polyamide, polyacetal, polyphenylene oxide, polybutylene terephthalate, ethylene-propylene-diene terpolymer (EPDM), sulfonated EPDM, styrene butadiene rubber, fluoro rubber, various copolymers, or the like. Any suitable binder available in the art may be used. An amount of the binder may be from about 1 part to about 50 parts by weight based on 100 parts by weight of the negative active material. For example, the amount of the binder may be from about 1 part to about 30 parts by weight, and in some embodiments, from about 1 part to about 20 parts by weight, and in some other embodiments, from about 1 part to about 15 parts by weight, each based on 100 parts by weight of the negative active material.

The conducting agent that provides a conduction path of the negative active material may be optionally used to further improve electrical conductivity. Non-limiting examples of the conducting agent are acetylene black, ketjen black, natural graphite, artificial graphite, carbon black, acetylene black, carbon fiber, and metal powder and metal fiber of, for example, copper, nickel, aluminum, silver, or the like. In some embodiments, at least one conducting material such as polyphenylene derivatives may be used alone or in a combination with at least one thereof, but is not limited to these. Any conducting agent available in the art may be used. The above-described crystalline carbonaceous materials may be added as the conducting agent. The amounts of the conducting agent may be properly adjusted. For example, a weight ratio of the negative active material to the conducting agent may be from about 99:1 to about 90:10.

Non-limiting examples of the solvent are N-methyl-pyrrolidone, acetone, water, or the like. Any material available as a suitable solvent in the art may be used.

The amounts of the negative active material, the conducting agent, the binder, and the solvent may be those levels that are generally used in the manufacture of lithium batteries in the art. At least one of the conducting agent, the binder and the solvent may not be used according to the use and the structure of the lithium battery.

In addition, the current collector is generally fabricated to have a thickness of from about 3 μm to about 500 μm. The material for the current collector is not particularly limited, and may be of any material which has a suitable conductivity without causing chemical changes in the fabricated battery. Non-limiting examples of the current collector are copper, stainless steel, aluminum, nickel, titanium, sintered carbon, copper or stainless steel that is surface-treated with carbon, nickel, titanium or silver, or aluminum-cadmium alloys. In addition, the current collector may be processed to have fine irregularities on its surfaces so as to enhance adhesive strength of the current collector to the negative active material, and may be used in any of various forms including films, sheets, foils, nets, porous structures, foams, non-woven fabrics, or the like.

According to another aspect, a lithium battery includes a negative electrode including any of the above-described negative active materials. The lithium battery may be manufactured in the following manner.

First, a negative electrode is prepared according to the above-described negative electrode manufacturing method.

Next, a positive active material, a conducting agent, a binder, and a solvent are mixed to prepare a positive active material composition. The positive active material composition is directly coated on a metallic current collector and dried to prepare a positive electrode plate. In some embodiments, the positive active material composition may be cast on a separate support to form a positive active material film, which may then be separated from the support and laminated on a metallic current collector to prepare a positive electrode plate.

The positive active material may include at least one selected from lithium cobalt oxide, lithium nickel cobalt manganese oxide, lithium nickel cobalt aluminum oxide, lithium iron phosphorous oxide, and lithium manganese oxide. The positive active material is not limited to these examples, and may be any positive active material available in the art.

For example, the positive active material may be a compound represented by one of the following formula: $Li_aA_{1-b}B_bD_2$ (where $0.90 \le a \le 1.8$, and $0 \le b \le 0.5$); $Li_aE_{1-b}B_bO_{2-c}D_c$ (where $0.90 \le a \le 1.8$, $0 \le b \le 0.5$, and $0 \le c \le 0.05$); $LiE_{2-b}B_bO_{4-c}D_c$ (where $0 \le b \le 0.5$, and $0 \le c \le 0.05$); $Li_aNi_{1-b-c}Co_bB_cD_\alpha$ (where $0.90 \le a \le 1.8$, $0 \le b \le 0.5$, $0 \le c \le 0.05$, and $0 < \alpha \le 2$); $Li_aNi_{1-b-c}Co_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_2$ (where $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (where $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_2$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dG_eO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$, and $0.001 \le b \le 0.1$); $Li_aCoG_bO_2$ (where $0.90 \le a \le 1.8$, and $0.001 \le b \le 0.1$); $Li_aMnG_bO_2$ (where $0.90 \le a \le 1.8$, and $0.001 \le b \le 0.1$); $Li_aMn_2G_bO_4$ (where $0.90 \le a \le 1.8$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); or $LiFePO_4$.

In the formula above, A is selected from nickel (Ni), cobalt (Co), manganese (Mn), and combinations thereof; B is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from cobalt (Co), manganese (Mn), and combinations thereof; F is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.

The compounds listed above as positive active materials may have a surface coating layer (hereinafter, "coating layer"). Alternatively, a mixture of a compound without a coating layer and a compound having a coating layer, the compounds being selected from the compounds listed above, may be used.

The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the positive active material when a compound of the coating element is used. For example, the coating layer may be formed using a spray coating method, a dipping method, or the like.

Non-limiting examples of the compound for the coating layer are $LiNiO_2$, $LiCoO_2$, $LiMn_xO_{2x}$ (x=1 or 2), $LiNi_{1-x}M-n_xO_2$ (0<x<1), $LiNi_{1-x-y}Co_xMn_yO_2$ ($0 \le x \le 0.5$, and $0 \le y \le 0.5$), $LiFeO_2$, $V_2O_5$, TiS, MoS, or the like.

The conducting agent, the binder and the solvent used for the positive active material composition may be the same as those used for the negative active material composition. Alternatively, a plasticizer may be further added into the positive active material composition and/or the negative active material composition to form pores in the electrode plates.

The amounts of the positive active material, the conducting agent, the binder, and the solvent are those levels that are generally used in the manufacture of a lithium battery. In certain embodiments, at least one of the conducting agent, the binder and the solvent may be omitted according to the use and the structure of the lithium battery.

Next, a separator that is to be disposed between the positive electrode and the negative electrode is prepared. The separator may be any separator that is suitable for lithium batteries. The separator may have low resistance to migration of ions in an electrolyte and have an excellent electrolyte-retaining ability. Suitable separator may be made of at least one material selected from glass fiber, polyester, Teflon, polyethylene, polypropylene, polytetrafluoroethylene (PTFE), and combinations thereof, each of which may be a non-woven or woven fabric. For example, a rollable separator including polyethylene, polypropylene, or the like may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. In some other embodiments, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate, a mixture thereof, or the like.

Next, an electrolyte is prepared.

The electrolyte may include a non-aqueous electrolyte and a lithium salt. The non-aqueous electrolyte may be a non-aqueous liquid electrolyte, an organic solid electrolyte, or an inorganic solid electrolyte.

Examples of the non-aqueous liquid electrolyte are any of aprotic organic solvents such as N-methyl-2-pyrrolidinone, propylene carbonate, ethylene carbonate (EC), butylene carbonate, dimethyl carbonate, diethyl carbonate (DEC), fluoroethylene carbonate (FEC), γ-butyrolactone, 1,2-dimethoxy ethane, tetrahydroxyfuran, 2-methyl tetrahydrofuran, dimethylsulfoxide, 1,3-dioxolane, 4-methyldioxolane, formamide, N,N-dimethyl formamide, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte are polyethylene derivatives, polyethylene oxide derivatives, polypropylene oxide derivatives, phosphoric acid ester polymers, polyester sulfide, polyvinyl alcohols, polyvinylidene fluoride, and polymers containing ionic dissociation groups.

Non-limiting examples of the inorganic solid electrolyte are nitrides, halides, sulfates, and silicates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any lithium salt that is suitable for the lithium electrode. The lithium salt may be any lithium salt that is soluble in the above-mentioned non-aqueous electrolyte. For example, the lithium salt may be at least one selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, lithium chloroborate, lower aliphatic carboxylic acid lithium, lithium tetraphenylborate, lithium amide, and combinations thereof.

Lithium batteries may be classified as either lithium ion batteries, lithium ion polymer batteries, or lithium polymer batteries, according to the types of separator and/or electrolyte included therein. In addition, a lithium battery may be classified as a cylindrical battery, a rectangular battery, a coin battery, or a pouch battery, according to the shape thereof. Lithium batteries may also be classified as either bulk type or thin film type, according to the size thereof, or as either lithium primary batteries or lithium secondary batteries.

These lithium batteries can be manufactured by any suitable method for manufacturing lithium batteries and a detailed description thereof will not be recited here.

FIG. 1 is a schematic view of a structure of a lithium battery 30 according to an embodiment. Referring to FIG. 1, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded, and then inserted into a battery case 25. Subsequently, an electrolyte is injected into the battery case 25 and the battery case 25 is sealed by a sealing member 26, thereby completing the manufacture of the lithium battery 30. The battery case 25 may have a cylindrical shape, a rectangular shape, a thin-film shape, or the like. The lithium battery 30 may be a lithium ion battery.

The lithium batteries 30 may be suitable for use as power sources for electric vehicles requiring high capacity, high-power output, and operation under high temperature conditions, in addition to power sources for conventional mobile phones and portable computers, and may be coupled to conventional internal combustion engines, fuel cells, or supercapacitors to be used in hybrid vehicles. In addition, the lithium battery may be used in all applications requiring high-power output, high voltage, and operation under high temperature conditions. The lithium battery may have improved high rate characteristics and improved battery life characteristics, and thus may be applicable in an electric vehicle (EV), for example, or in a hybrid vehicle such as a plug-in hybrid electric vehicle (PHEV).

Thereinafter, one or more embodiments of the present invention will be described in more detail with reference to the following examples. However, these examples are not intended to limit the scope of the one or more embodiments of the present invention.

Preparation of a Composite Core

Preparation Example 1

Silicon nanowires (SiNW) were grown on spherical graphite using a vapor-liquid-solid (VLS) growing method. The spherical graphite used was spherical natural graphite (available from Hitachi Chemical Co.) having an average diameter of about 10 μm. After applying an Ag catalyst on a surface of the spherical graphite, the spherical graphite was exposed to $SiH_4$ gas flowing at a temperature of about 500° C. or greater to grow Si nanowires thereon, thereby preparing a composite core.

Particles of the spherical graphite were randomly collected and analyzed using FPIA-3000 to measure circularities. As a result, the spherical graphite particles had a circularity ranging from about 0.808 to about 1.000 as follows:

Circularity: 0.808, 0.844, 0.861, 0.878, 0.879, 0.883, 0.884, 0.888, 0.891, 0.892, 0.907, 0.908, 0.913, 0.914, 0.916, 0.918, 0.922, 0.923, 0.924, 0.928, 0.929, 0.934, 0.935, 0.937, 0.938, 0.939, 0.942, 0.943, 0.946, 0.946, 0.947, 0.948, 0.949, 0.952, 0.956, 0.959, 0.961, 0.962, 0.963, 0.963, 0.963, 0.964, 0.964, 0.966, 0.967, 0.967, 0.970, 0.972, 0.976, 0.977, 0.977, 0.977, 0.979, 0.979, 0.982, 0.983, 0.984, 0.986, 0.990, 0.994, 0.995, 0.996, 1.000, 1.000.

Figure 2:
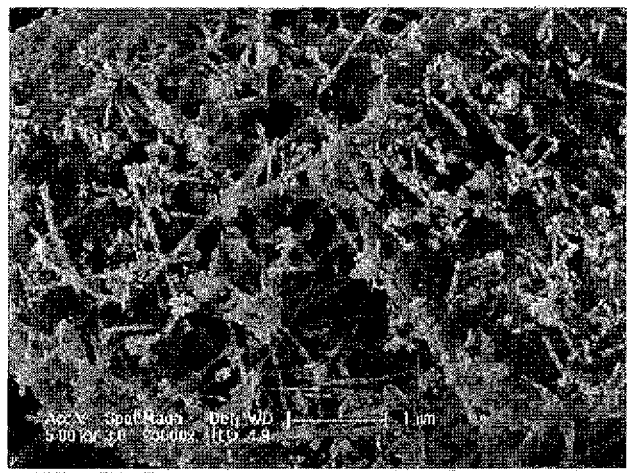
FIG. 2 is a field-emission scanning electron microscopic (FE-SEM) image of a composite core of Preparation Example 1.

A field-emission scanning electron microscopic (FE-SEM) image of the composite core is shown in FIG. 2.

The spherical graphite of the composite core was in the form of porous particles having a porosity of about 15 volume % based on the total volume of the composite core. The grown Si nanowires had an average diameter of from about 30 nm to about 50 nm and an average length of about 1.5 μm. The amount of the Si nanowires in the composite core is about 8.0 wt % of a total weight of the composite core.

Preparation of Composite Negative Active Material

Comparative Example 1

Figure 3A:
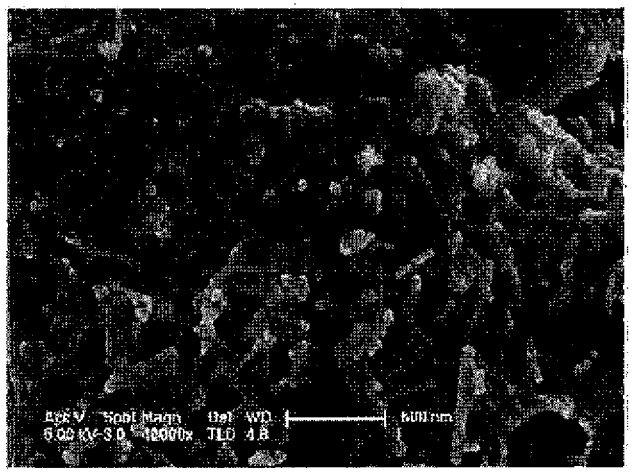
FIG. 3A is a scanning electron microscopic (SEM) image of a negative active material of Comparative Example 1 before calcination.
Figure 3B:
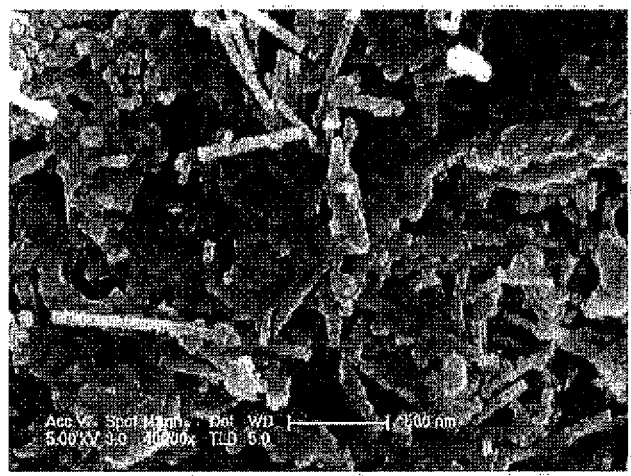
FIG. 3B is an SEM image of a negative active material of Comparative Example 1 after calcination.

25 g of the composite core powder prepared in Preparation Example 1 and 0.25 g of titanium isopropoxide [(Ti(OCH$(CH_3)_2)_4$, Product No. 205273, available from Aldrich] were added to 200 ml of isopropyl alcohol, and mixed together to prepare a mixed solution. The mixed solution was agitated in a stirrer equipped with a heater at about 100° C. and at about 300 rpm to remove the solvent therefrom, resulting in a dried powder. The dried powder was calcined at about 600° C. for 1 hour in a nitrogen ($N_2$) atmosphere to obtain a calcined product. The calcined product was ground to obtain a negative active material with a 1 wt % of titanium dioxide layer on a composite core. Scanning electron microscopic (SEM) images of the negative active material before and after the calcinations are shown in FIGS. 3A and 3B, respectively.

Comparative Example 2

Surfaces of the composite core powder of Preparation Example 1 were coated with about 20 wt % of coal tar pitch based on 100 wt % of a total weight of the negative active material (pitch coating). The pitch-coated composite core powder was thermally treated at about 800° C. in a nitrogen atmosphere to prepare a negative active material with a 20 wt % of pitch coating layer.

Figure 4:
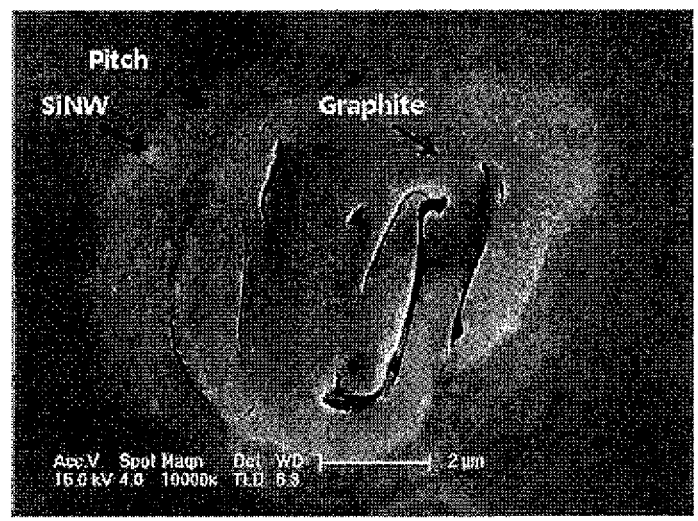
FIG. 4 is a FE-SEM image of a cross-section of a negative active material of Comparative Example 2.

A magnified FE-SEM image of a cross-section of the negative active material of Comparative Example 2 is shown in FIG. 4. Referring to FIG. 4, the negative active material is found to have a pitch coating layer having a thickness of about 1.5 μm to about 2 μm over the silicon nanowires (SiNW) grown on the spherical graphite, and the pitch coating layer is found to cover the SiNW.

Example 1

The negative active material of Comparative Example 1 with the titanium dioxide layer on the composite core was coated with about 10 wt % of coal tar pitch based on 100 wt % of a total weight of the negative active material (pitch coating). The pitch-coated product was thermally treated at about 800° C. in a nitrogen atmosphere to prepare a negative active material with a 1 wt % of titanium oxide layer and a 10 wt % of pitch coating layer.

Example 2

The negative active material of Comparative Example 1 with the titanium dioxide layer on the composite core was coated with about 20 wt % of coal tar pitch based on 100 wt % of a total weight of the negative active material (pitch coating). The pitch-coated product was thermally treated at about 800° C. in a nitrogen atmosphere to prepare a negative active material with a 1 wt % of titanium oxide layer and a 20 wt % of pitch coating layer.

Example 3

Surfaces of the composite core powder of Preparation Example 1 were coated with about 10 wt % of coal tar pitch based on 100 wt % of a total weight of the negative active material (pitch coating). The pitch-coated product was thermally treated at about 800° C. in a nitrogen atmosphere.

25 g of the pitch-coated composite core powder and 0.125 g of titanium isopropoxide [(Ti(OCH(CH$_3$)$_2$)$_4$, Product No. 205273, available from Aldrich] were added to 200 ml of isopropyl alcohol, and mixed together to prepare a mixed solution. The mixed solution was agitated in a stirrer equipped with a heater at about 100° C. and at about 300 rpm to remove the solvent therefrom, resulting in a dried powder. The dried powder was calcined at about 600° C. for 1 hour in a nitrogen (N$_2$) atmosphere to obtain a calcined product. The calcined product was ground to obtain a negative active material with a 10 wt % of pitch coating layer and a 0.5 wt % of titanium dioxide layer on a composite core.

Example 4

Surfaces of the composite core powder of Preparation Example 1 were coated with about 10 wt % of coal tar pitch based on 100 wt % of a total weight of the negative active material (pitch coating). The pitch-coated product was thermally treated at about 800° C. in a nitrogen atmosphere.

25 g of the pitch-coated composite core powder and 0.25 g of titanium isopropoxide [(Ti(OCH(CH$_3$)$_2$)$_4$, Product No. 205273, available from Aldrich] were added to 200 ml of isopropyl alcohol, and mixed together to prepare a mixed solution. The mixed solution was agitated in a stirrer equipped with a heater at about 100° C. and at about 300 rpm to remove the solvent therefrom, resulting in a dried powder. The dried powder was calcined at about 600° C. for 1 hour in a nitrogen (N$_2$) atmosphere to obtain a calcined product. The calcined product was ground to obtain a negative active material with a 10 wt % of pitch coating layer and a 1 wt % of titanium dioxide layer on a composite core.

Example 5

Surfaces of the composite core powder of Preparation Example 1 were coated with about 10 wt % of coal tar pitch based on 100 wt % of a total weight of the negative active material (pitch coating). The pitch-coated product was thermally treated at about 800° C. in a nitrogen atmosphere.

25 g of the pitch-coated composite core powder and 0.375 g of titanium isopropoxide [(Ti(OCH(CH$_3$)$_2$)$_4$, Product No. 205273, available from Aldrich] were added to 200 ml of isopropyl alcohol, and mixed together to prepare a mixed solution. The mixed solution was agitated in a stirrer equipped with a heater at about 100° C. and at about 300 rpm to remove the solvent therefrom, resulting in a dried powder. The dried powder was calcined at about 600° C. for 1 hour in a nitrogen (N$_2$) atmosphere to obtain a calcined product. The calcined product was ground to obtain a negative active material with a 10 wt % of pitch coating layer and a 1.5 wt % of titanium dioxide layer on a composite core.

Example 6

Surfaces of the composite core powder of Preparation Example 1 were coated with about 10 wt % of coal tar pitch based on 100 wt % of a total weight of the negative active material (pitch coating). The pitch-coated product was thermally treated at about 800° C. in a nitrogen atmosphere.

25 g of the pitch-coated composite core powder and 0.5 g of titanium isopropoxide [(Ti(OCH(CH$_3$)$_2$)$_4$, Product No. 205273, available from Aldrich] were added to 200 ml of isopropyl alcohol, and mixed together to prepare a mixed solution.

The mixed solution was agitated in a stirrer equipped with a heater at about 100° C. and at about 300 rpm to remove the solvent therefrom, resulting in a dried powder. The dried powder was calcined at about 600° C. for 1 hour in a nitrogen (N$_2$) atmosphere to obtain a calcined product. The calcined product was ground to obtain a negative active material with a 10 wt % of pitch coating layer and a 2 wt % of titanium dioxide layer on a composite core.

Manufacture of Negative Electrode, Positive Electrode, and Lithium Battery

Comparative Example 3

A first mixture of the negative active material of Comparative Example 1 and graphite powder in a weight ratio of 25:75, and a second mixture as a binder of styrene butadiene rubber (SBR) and carboxymethyl cellulose (CMC) in a weight ratio of about 1:1 were mixed in a weight ratio of about 98:2 to prepare a negative active material slurry.

This negative active material slurry was coated in an amount of about 9 mg/cm$^2$ on a copper foil current collector having a thickness of about 10 μm. The negative electrode plate after the coating was dried at about 120° C. for about 15 minutes, and was then pressed to prepare a negative electrode.

To manufacture a positive electrode, lithium cobalt oxide (LCO, LiCoO$_2$) as a positive active material, carbon black as a conducting agent, and polyvinylidene fluoride (PVdF) as a binder were mixed in a weight ratio of about 97.5:1:1.5 to prepare a positive active material slurry.

This positive active material slurry was coated in an amount of about 18 mg/cm² on an aluminum foil current collector having a thickness of about 12 μm. The positive electrode plate after the coating was dried at about 120° C. for about 15 minutes, and was then pressed to prepare a positive electrode.

The positive electrode, the negative electrode, a polyethylene separator (STAR 20, available from Asahi) as a separator, and an electrolyte including 1.15 M $LiPF_6$ dissolved in a mixed solvent of ethylenecarbonate (EC), ethylmethylcarbonate (EMC) and diethylcarbonate (DEC) in a volume ratio of 3:3:4 were used to manufacture a coin cell.

Comparative Example 4

A lithium battery was manufactured in the same manner as in Comparative Example 3, except that the negative active material of Comparative Example 2 was used.

Example 7

A lithium battery was manufactured in the same manner as in Comparative Example 3, except that the negative active material of Example 1 was used.

Example 8

A lithium battery was manufactured in the same manner as in Comparative Example 3, except that the negative active material of Example 2 was used.

Example 9

A lithium battery was manufactured in the same manner as in Comparative Example 3, except that the negative active material of Example 3 was used.

Example 10

A lithium battery was manufactured in the same manner as in Comparative Example 3, except that the negative active material of Example 4 was used.

Example 11

A lithium battery was manufactured in the same manner as in Comparative Example 3, except that the negative active material of Example 5 was used.

Example 12

A lithium battery was manufactured in the same manner as in Comparative Example 3, except that the negative active material of Example 6 was used.

Evaluation Example 1

Effects of amount of the coated pitch on battery characteristics were evaluated as follows.
(Evaluation of Initial Efficiency and Battery Life Characteristics)

The lithium batteries of Examples 7 and 8 and Comparative Examples 3 and 4 were each charged at a constant current of 0.2 C rate at about 25° C. to a voltage of about 0.01 V (with respect to Li), and then charged at a constant voltage of about 0.01 V to a current of about 0.01 C, followed by discharging at a constant current of 0.2 C to a voltage of 1.5 V (with respect to Li).

Subsequently, each of the lithium batteries was charged at a constant current of 0.5 C rate to a voltage of about 0.01 V (with respect to Li), and then charged at a constant voltage of about 0.01 V to a current of 0.01 C, followed by discharging at a constant current of 0.5 C to a voltage of about 1.5 V (with respect to Li) (formation process).

Each of the lithium batteries after the formation process was charged at a constant current of 1.0 C rate at about 25° C. to a voltage of about 0.01 V (with respect to Li), and then charged at a constant voltage of about 0.01 V to a current of 0.01 C, followed by discharging at a constant current of about 1.0 C to a voltage of about 1.5 V (with respect to Li). This cycle of charging and discharging was repeated 50 times.

The initial efficiencies of the lithium batteries are shown in Table 1. The initial efficiency of a lithium battery is determined by the charge-discharge efficiency, (CDE) defined as Equation 1 below.

Charge-discharge efficiency(CDE,%)=[Discharge capacity at 1$^{st}$ cycle/Charge capacity at 1$^{st}$ cycle]×100   <Equation 1>

TABLE 1

| Example | Discharge capacity (mAh/g) | Charge capacity (mAh/g) | Initial efficiency (%) |
|---|---|---|---|
| Comparative Example 3 | 824 | 929 | 88.7 |
| Comparative Example 4 | 692 | 796 | 86.9 |
| Example 7 | 778 | 890 | 87.4 |
| Example 8 | 702 | 807 | 87.0 |

Figure 5:
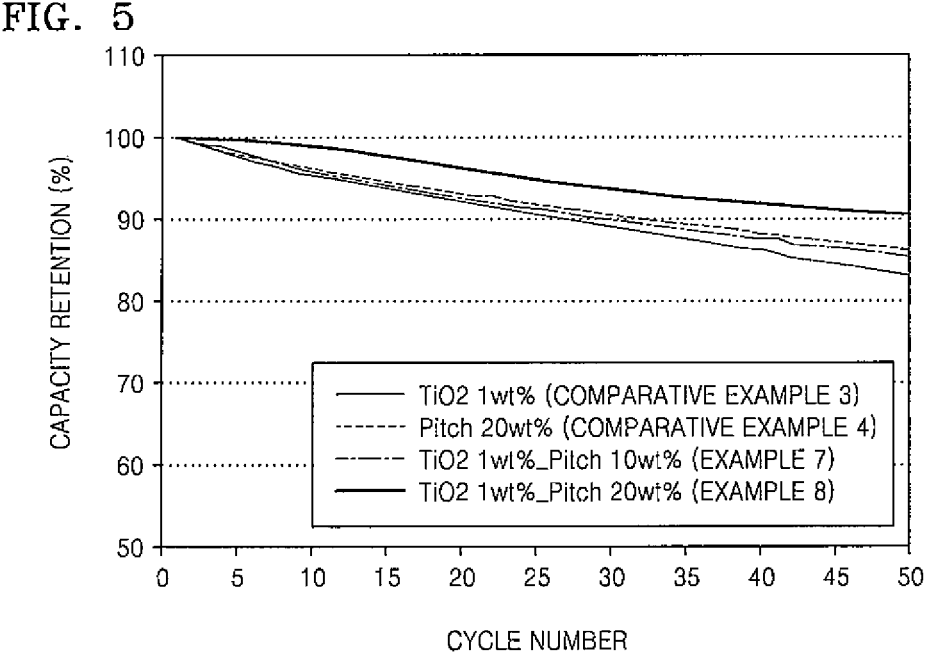
FIG. 5 is a graph illustrating battery life characteristics of lithium batteries of Examples 7 and 8, and Comparative Examples 3 and 4.

The capacity retention rates of the lithium batteries are shown in FIG. 5. The capacity retention rate (CRR) is defined as Equation 2 below.

Capacity retention rate[%]=[Discharge capacity at each cycle/Discharge capacity at 1$^{st}$ cycle]×100   <Equation 2>

Referring to Table 1 and FIG. 5, the lithium batteries of Examples 7 and 8 including both the titanium dioxide coating layer and the pitch coating layer were found to have improved battery life characteristics as compared with those of the lithium battery of Comparative Example 3 including only the titanium dioxide coating layer.

The lithium battery of Example 8 including both the titanium dioxide coating layer and the pitch coating layer were found to have improved battery life characteristics as compared with those of the lithium battery of Comparative Example 4 including only the pitch coating layer.

The lithium battery of Example 7 including the pitch coating layer in relatively smaller amount than that of Example 8 and the titanium dioxide coating layer was found to have higher capacity and higher initial efficiency, and similar battery life characteristics as compared with those of the lithium battery of Comparative Example 4 including only the pitch coating layer. This indicates that forming a double coating layer including a pitch coating layer in reduced amount along with a titanium dioxide coating layer may be effective in improving characteristics of a lithium battery.
(Volume Expansion Rate Measurement)

After being charged at 0.05 C (formation process), the lithium batteries of Examples 7 and 8 and Comparative Example 3 were disassembled to separate a negative electrode plate from each battery. A volume expansion rate was measured by comparing the thicknesses of the negative electrode plates before and after the charging. The results of the volume expansion rate measurements are shown in FIG. 6.

Figure 6:
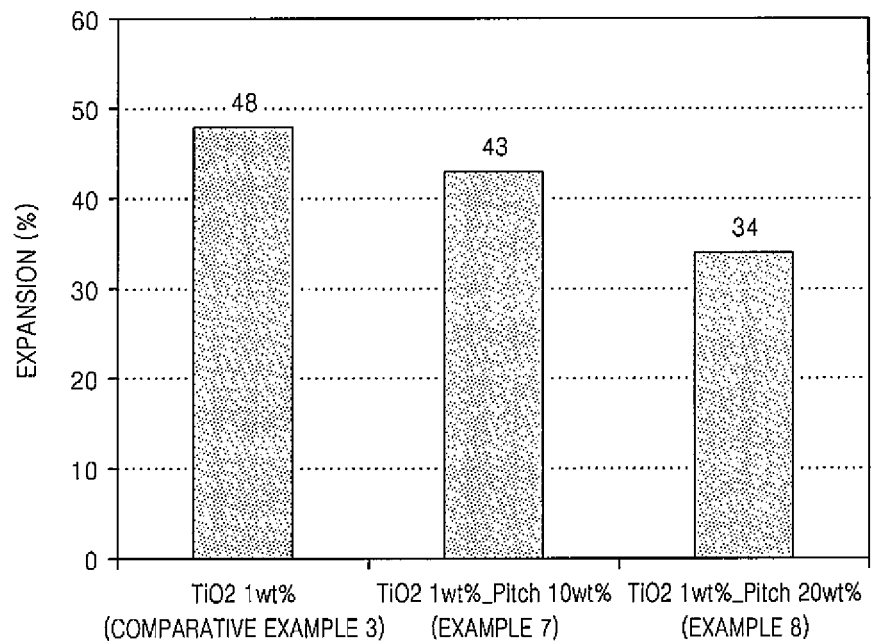
FIG. 6 is a graph illustrating the results of measuring volume expansion rate of negative electrode plate of the lithium batteries of Examples 7 and 8 and Comparative Example 3.

Referring to FIG. 6, the lithium batteries of Examples 7 and 8 including both the titanium dioxide coating layer and the pitch coating layer were found to have lower volume expansion rates as compared with the volume expansion rate of the lithium battery of Comparative Example 3 including only the titanium dioxide coating layer. This is attributed to that the pitch coating suppressed expansion of the SiNWs.

Evaluation Example 2

Effects of the amount of the coated titanium dioxide on battery characteristics were evaluated as follows.
(Evaluation of Initial Efficiency and Battery Life Characteristics)

The initial efficiencies and battery life characteristics of the lithium batteries of Examples 9 to 12 and Comparative Example 3 and 4 were evaluated in the same manner as in Evaluation Example 1. The initial efficiencies and battery life characteristics of the lithium batteries are shown in Table 2 below and FIG. 7, respectively.

TABLE 2

| Example | Discharge capacity (mAh/g) | Charge capacity (mAh/g) | Initial efficiency (%) |
|---|---|---|---|
| Comparative Example 3 | 824 | 929 | 88.7 |
| Comparative Example 4 | 692 | 796 | 86.9 |
| Example 9 | 812 | 898 | 90.4 |
| Example 10 | 811 | 901 | 90.0 |
| Example 11 | 815 | 903 | 90.3 |
| Example 12 | 801 | 897 | 89.3 |

Figure 7:
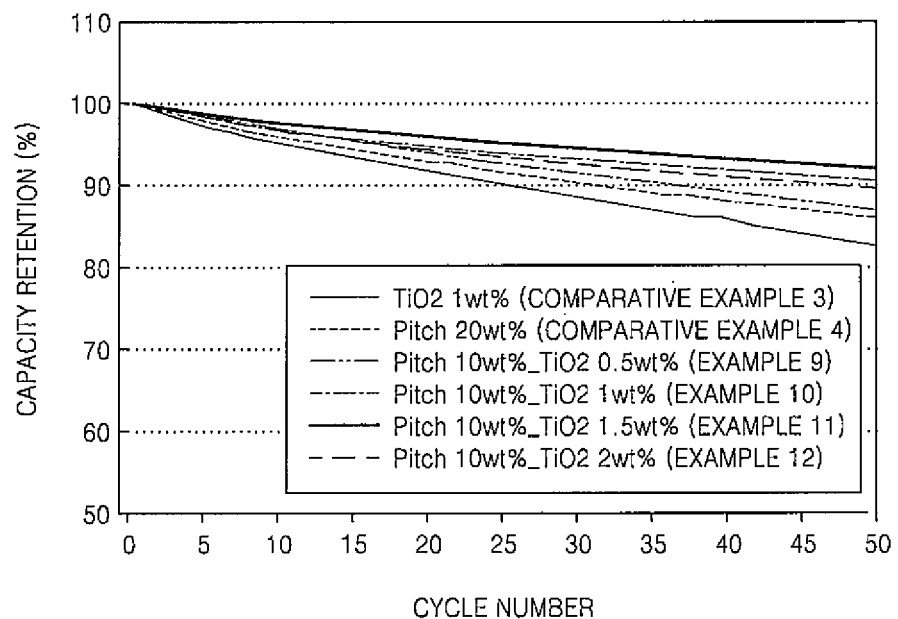
FIG. 7 is a graph illustrating battery life characteristics of the lithium batteries of Examples 9 to 12, and Comparative Examples 3 and 4.

Referring to Table 2 and FIG. 7, forming a titanium oxide coating layer along with a pitch coating layer is found to provide improved characteristics as compared with forming only a pitch coating layer. As a result, the pitch coating layer likely leads to lower capacity and initial efficiency and may be used in a smaller amount.

In particular, the lithium batteries of Examples 9 to 12 in which the amount of the pitch coating layer was reduced to about 10 wt % with variations in the amount of the titanium dioxide coating layer were found to have improved initial efficiencies and improved battery life characteristics, as compared with those of the lithium battery (for example, Comparative Example 4) including only the pitch coating layer in about 20 wt %, as shown in Table 2 and FIG. 7.

(Evaluation of High-Temperature Battery Life Characteristics)

To evaluate high-temperature battery life characteristics when using a negative active material including a titanium dioxide coating layer as an outer coating layer coated on a pitch coating layer, the lithium batteries of Example 11 and Comparative Examples 3 and 4 were charged and discharged in the same condition as in Evaluation Example 1 using a charger and discharger set to about 60° C.

The initial efficiencies at high temperature of the lithium batteries of Example 1 and Comparative Examples 3 and 4 are shown in Table 3 below. The high-temperature battery life characteristics thereof are shown in FIG. 8.

TABLE 3

| Example | Discharge capacity (mAh/g) | Charge capacity (mAh/g) | Initial efficiency (%) |
|---|---|---|---|
| Comparative Example 3 | 811 | 916 | 88.5 |
| Comparative Example 4 | 702 | 807 | 87.0 |
| Example 11 | 804 | 911 | 88.3 |

Figure 8:
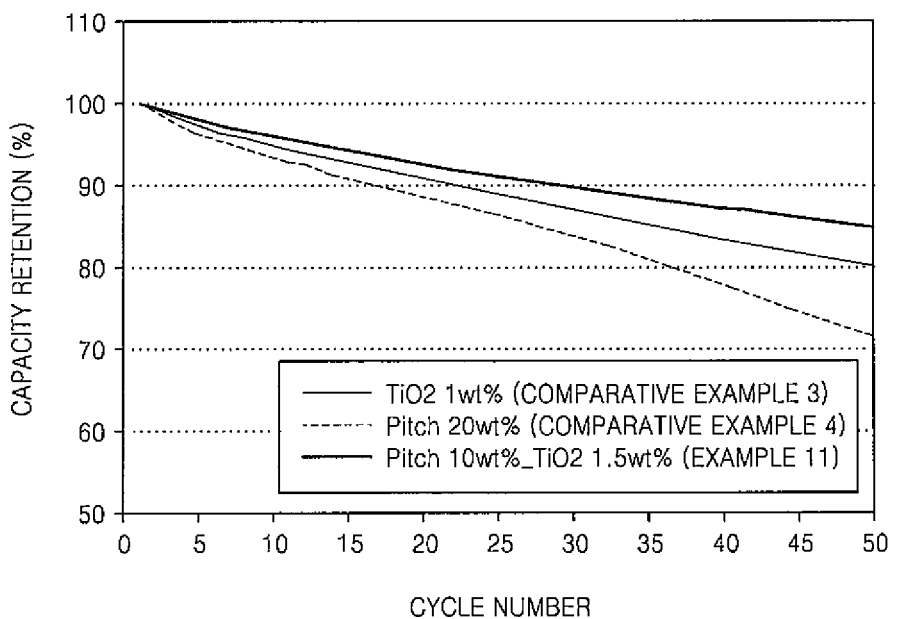
FIG. 8 is a graph illustrating high-temperature battery life characteristics of the lithium batteries of Example 11 and Comparative Examples 3 and 4.

Referring to Table 3 and FIG. 8, the lithium battery of Comparative Example 4 including only the pitch coating layer is found to have poor high-temperature battery life characteristics as compared with the lithium battery of Comparative Example 3 including only the titanium dioxide coating layer. However, the high-temperature battery life characteristics of the lithium battery of Comparative Example 4 were improved by coating a titanium dioxide coating layer as an outer coating layer coated on a pitch coating layer as in the lithium battery of Example 11.

As described above, according to the one or more of the above embodiments of the present invention, using a negative active material with a double coating layer including a metal oxide coating layer and an amorphous carbonaceous coating layer on a composite core with a metal/metalloid nanostructure disposed on a carbonaceous base may improve discharge capacity and battery life characteristics of a lithium battery.

While the present invention has been particularly shown and described with reference to embodiments thereof, it will be understood by those of ordinary skill in the art that various changes in form and details may be made therein without departing from the spirit and scope of the present invention as defined by the following claims and equivalents thereof.

What is claimed is:

1. A negative active material, comprising:
    a composite core particle comprising a carbonaceous base, and a metal or metalloid nanostructure on the carbonaceous base; and
    a coating layer formed on at least part of the composite core particle and comprising a metal oxide coating layer and an amorphous carbonaceous coating layer,
    wherein the metal oxide coating layer is disposed on the composite core particle, and the amorphous carbonaceous coating layer is disposed on the metal oxide coating layer; or
    wherein the amorphous carbonaceous coating layer is disposed on the composite core particle, and the metal oxide coating layer is disposed on the amorphous carbonaceous coating layer.

2. The negative active material of claim 1, wherein the metal oxide coating layer comprises an oxide of at least one metal selected from the group consisting of elements of Group 2 to Group 13 of the periodic table of elements.

3. The negative active material of claim 1, wherein the metal oxide coating layer comprises an oxide of at least one metal selected from the group consisting of zinc (Zn), zirconium (Zr), nickel (Ni), cobalt (Co), manganese (Mn), boron (B), magnesium (Mg), calcium (Ca), strontium (Sr), barium (Ba), titanium (Ti), vanadium (V), iron (Fe), copper (Cu), and aluminum (Al).

4. The negative active material of claim 1, wherein the metal oxide coating layer comprises a metal oxide represented by Formula 1 below:

$$M_aO_b \qquad \text{<Formula 1>}$$

wherein, in Formula 1, 1≤a≤4, 1≤b≤10, and M is at least one selected from the group consisting of zirconium (Zr), nickel (Ni), cobalt (Co), manganese (Mn), boron (B), magnesium (Mg), calcium (Ca), strontium (Sr), barium (Ba), titanium (Ti), vanadium (V), iron (Fe), copper (Cu), and aluminum (Al).

5. The negative active material of claim 1, wherein the metal oxide coating layer comprises at least one oxide selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide.

6. The negative active material of claim 1, wherein the metal oxide coating layer is inert to lithium.

7. The negative active material of claim 1, wherein the metal oxide coating layer does not form a lithium metal oxide with lithium.

8. The negative active material of claim 1, wherein an amount of the metal oxide coating layer is from about 0.1 wt % to about 20 wt % based on a total weight of the negative active material.

9. The negative active material of claim 1, wherein the amorphous carbonaceous coating layer comprises amorphous carbon selected from the group consisting of soft carbon, hard carbon, carbon pitch, meso-phase carbon pitch, sintered corks, and combinations thereof.

10. The negative active material of claim 1, wherein an amount of the amorphous carbonaceous coating layer is from about 1 wt % to about 30 wt % based on a total weight of the negative active material.

11. The negative active material of claim 1, wherein the metal or metalloid nanostructure is in a form of at least one selected from the group consisting of nanowires, nanotubes, nanobelts, nanorods, nanoporous bodies, and nanotemplates.

12. The negative active material of claim 1, wherein the metal or metalloid nanostructure comprises at least one element selected from the group consisting of elements of Groups 13, 14, and 15 of the periodic table of elements.

13. The negative active material of claim 1, wherein the metal or metalloid nanostructure comprises at least one element selected from the group consisting of silicon (Si), germanium (Ge) and tin (Sn).

14. The negative active material of claim 1, wherein the metal or metalloid nanostructure is a silicon-based nanowire comprising at least one material selected from the group consisting of Si, $SiO_x$ (0<x<2), Si—Z alloy, and combinations thereof, wherein Z is an alkali metal, an alkali earth metal, an element of Group 11, 12, 13, 14, 15, and 16 of the periodic table of elements, a transition metal, a rare-earth element, or a combination thereof, and is not Si.

15. The negative active material of claim 1, wherein the carbonaceous base comprises at least one selected from the group consisting of natural graphite, artificial graphite, expandable graphite, graphene, carbon black, fullerene soot, carbon nanotube, and carbon fiber.

16. The negative active material of claim 1, wherein the carbonaceous base is in spherical, planar, fibrous, tubular, or powder form.

17. A negative electrode, comprising:
the negative active material of claim 1.

18. A lithium battery comprising:
the negative electrode of claim 17.

* * * * *